W. W. CROOKER.
BUNG.

No. 181,317.  Patented Aug. 22, 1876.

Attest:
H. L. Perrine
H. D. Hutton

Wm. W. Crooker,
Inventor.
by W. Osgood
Attorney.

UNITED STATES PATENT OFFICE.

WILLIAM W. CROOKER, OF WAUKEGAN, ILLINOIS.

IMPROVEMENT IN BUNGS.

Specification forming part of Letters Patent No. 181,317, dated August 22, 1876; application filed August 14, 1876.

*To all whom it may concern:*

Be it known that I, WILLIAM W. CROOKER, of Waukegan, Lake county, and State of Illinois, have invented certain new and useful Improvements in Bungs, of which the following is a full, clear, and exact description, reference being had to the accompanying drawings, and the letters of reference marked thereon.

Figure 1:
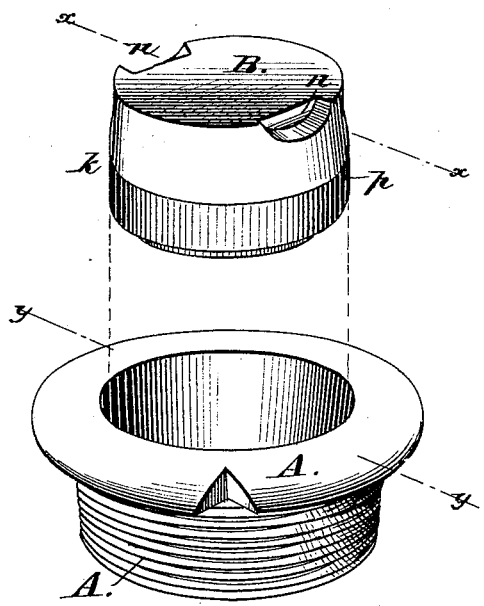
Figure 2:
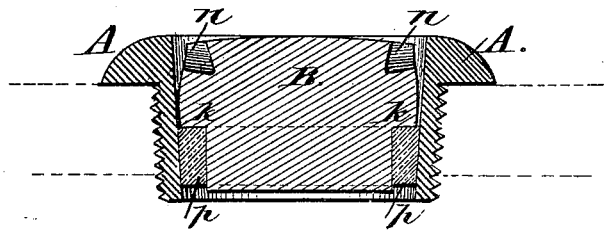

In the drawings, Figure 1 is an isometric view of my improved bung, and Fig. 2 an axial section, showing the bung driven down to its seat.

Like letters in both figures indicate corresponding parts.

The object of my invention is to produce a bung which may be driven to its seat by use of the ordinary hammer or maul, and afterward, when desired, may be easily and readily withdrawn by employing any ordinary pointed tool or instrument; to accomplish which it (the invention) consists in certain peculiarities of construction and combinations of parts, to be hereinafter more fully described and pointed out in the claims.

A is an ordinary metallic bung-bush, such as is usually employed in connection with beer-casks, and the like. It has a slightly-inclined or conical seat, which receives the reversely-conical bung B, made also of metal. This bung B has a recess, $k$, to receive a packing-ring or gasket, $p$, of leather, rubber, or any other suitable material; and it (the said bung) is so proportioned with respect to the bush as that it shall be flush, or nearly so, with the top of the bush when driven firmly into place.

The bung is driven into place, as before intimated, by simple concussion.

As shown in Fig. 2, the reverse inclines afford a space between the bung and its bush, into which sealing material, such as melted resin and the like, may be poured for the purpose of preventing the escape of gas arising from the liquor contained in the cask. This sealing material, in connection with the gasket $p$, affords practically an additional barrier to the escape of gas, and thus doubly insures perfect corking. This space also affords a novel and effective means for withdrawing the bung from its seat, which is done by inserting any convenient tool alternately in the notches $n\ n$ oppositely placed, and bearing down upon the bush.

It will be seen that this operation will rock the bung back and forth, eject the sealing material, if any be used, and accomplish the withdrawal of the bung.

The ordinary wooden bungs most commonly employed are objectionable, in that when once used they must be destroyed before they can be withdrawn, and, being of necessity inclined to correspond with the seat or bush, they afford no room for packing material. They must, moreover, be made of wood of uniformly fine quality, and be cut out by special machinery, which renders them quite expensive.

The metallic bung herein described is obviously better, and in the end much the cheaper, since it may be used indefinitely; and it may also be employed in connection with bushes varying in size, by simply adapting the gasket thereto.

Having now fully described my invention, what I claim as new, and desire to secure by Letters Patent, is—

1. In combination with the bush A, the conical bung B, provided with a gasket, and affording the space between the two for the sealing material, as explained.

2. The conical bung B, provided with the notches or indentations $n\ n$, as described.

In testimony that I claim the foregoing I have hereunto set my hand in the presence of two witnesses.

WILLIAM W. CROOKER.

Witnesses:
H. L. PERRINE,
H. D. HUTTON.